US009158035B2

(12) United States Patent
Dam

(10) Patent No.: US 9,158,035 B2
(45) Date of Patent: Oct. 13, 2015

(54) SYSTEM AND METHOD OF AUTOMATED ACQUISITION, CORRELATION AND DISPLAY OF POWER DISTRIBUTION GRID OPERATIONAL PARAMETERS AND WEATHER EVENTS

(75) Inventor: Quang Binh Dam, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 13/440,772

(22) Filed: Apr. 5, 2012

(65) Prior Publication Data

US 2013/0268196 A1    Oct. 10, 2013

(51) Int. Cl.
| | |
|---|---|
| *G01W 1/00* | (2006.01) |
| *G01W 1/10* | (2006.01) |
| *G06Q 10/04* | (2012.01) |
| *G06Q 50/06* | (2012.01) |

(52) U.S. Cl.
CPC . *G01W 1/00* (2013.01); *G01W 1/10* (2013.01); *G06Q 10/04* (2013.01); *G06Q 50/06* (2013.01); *Y04S 10/60* (2013.01)

(58) Field of Classification Search
CPC ........ G01W 1/06; G01W 1/10; Y02B 90/245; Y04S 20/40; Y04S 10/30; G06F 17/5036
USPC .................. 702/3, 57, 60, 121, 130, 178, 189
See application file for complete search history.

(56) References Cited

U.S. PATENT DOCUMENTS

| | | | |
|---|---|---|---|
| 5,751,914 A | 5/1998 | Coley et al. | |
| 6,112,074 A * | 8/2000 | Pinder | 455/404.2 |
| 6,952,648 B1 * | 10/2005 | Menard et al. | 702/3 |
| 7,010,437 B2 | 3/2006 | Lubkeman et al. | |

(Continued)

OTHER PUBLICATIONS

Ronald N. Keener, Jr., "The Estimated Impact of Weather on Daily Electric Utility Operations", Science Policy, Colorado, Oct. 3, 2011 (4 pages).

(Continued)

*Primary Examiner* — Michael Nghiem
*Assistant Examiner* — Eman Alkafawi
(74) *Attorney, Agent, or Firm* — Sutherland Asbill & Brennan LLP

(57) ABSTRACT

Significant changes in monitored and reported operational parameters and/or power outage events occurring in a utility's electrical power transmission/distribution grid are correlated with historical, current and/or forecast weather events based on potential root cause, geographic and temporal constraints. Operational event and outage information is collected and time-stamped using a communication network of devices and sources that monitor and report, among other things, equipment parameters, electric power availability and outages. A computer-implemented root cause analysis engine (RCA) operatively associated with a computer-implemented weather data correlation engine sorts and analyzes operational parameter/event information and identifies probable correlations to localized weather phenomenon. Operational parameters/events are then displayed using a graphic display device in a manner that enables user controllable and configurable viewing of a time-lapse evolution of weather phenomenon overlayed with graphics representing both weather-related and other relevant operational parameters/events depicted in relation to the utility's physical infrastructure.

10 Claims, 6 Drawing Sheets

Non-limiting Example System Hardware

(56) References Cited

U.S. PATENT DOCUMENTS

| | | |
|---|---|---|
| 7,327,998 B2 | 2/2008 | Kumar et al. |
| 8,775,109 B2 * | 7/2014 | Curt et al. .................. 702/65 |
| 2005/0090995 A1 * | 4/2005 | Sonderegger .................. 702/57 |
| 2008/0319724 A1 * | 12/2008 | Domijan et al. .................. 703/2 |
| 2009/0316671 A1 * | 12/2009 | Rolf et al. .................. 370/338 |
| 2010/0152910 A1 * | 6/2010 | Taft .................. 700/286 |
| 2010/0191487 A1 * | 7/2010 | Rada et al. .................. 702/60 |
| 2011/0077790 A1 * | 3/2011 | Vaswani et al. .................. 700/291 |
| 2011/0175750 A1 * | 7/2011 | Anderson et al. .......... 340/870.16 |
| 2012/0029715 A1 * | 2/2012 | Curt et al. .................. 700/291 |

OTHER PUBLICATIONS

Dr. Tony Phillips, "Severe Space Weather—Social and Economic Impacts", Science @ NASA, Jan. 21, 2009 (4 pages).

Rich Wilson, "Lightning Protection and Weather Forecasting: How the Two Work Together", Electric Energy Publications, Inc., 2011 (4 pages).

Lloyd A. Treinish, "Design and Deployment of Specialized Visualizations for Weather-Sensitive Electric Distribution Operations", Fourth Symposium on Policy and Socio-Economic Research 4.1, IBM Corporation, Yorktown Heights, New York, 2010 (24 pages).

* cited by examiner

Non-limiting Example System Hardware

Non-Limiting Example Data Flow and Processing for Weather Event-Operational Event Correlation Display System Non-Limiting Example Processing Steps for Weather Event-Operational Event Correlation & Display System Non-Limiting Example Root Cause Analysis Engine (240)

Non-Limiting Example Weather-Operational Event
Correlation Display Screen

SYSTEM AND METHOD OF AUTOMATED ACQUISITION, CORRELATION AND DISPLAY OF POWER DISTRIBUTION GRID OPERATIONAL PARAMETERS AND WEATHER EVENTS

The technology disclosed herein relates generally to automated information acquisition, event correlation and information display. More specifically, the disclosed technology relates to a computer-implemented tool/system and method for acquiring information concerning operational parameters/events occurring in an electrical power distribution grid, determining degree of correlation of such events to relevant weather phenomenon, and for displaying the acquired information as an animated time-lapse event evolution in a user-controllable manner.

BACKGROUND

Weather conditions and events can have a significant impact upon the generation and distribution of electric power and, consequently, in the number and type of service outages that may result and affect the customers of a particular electrical power utility company. Typically, the generation/transmission/distribution grid of an electrical power utility company will experience periodic service outages due to weather conditions that effect power distribution and availability to specific customers and/or specific areas. Consequently, it would certainly be useful for a utility to know or at least to be able to more accurately predict the types and likely occurrence of operational parameters/events and power outages that are directly caused by local or regional weather events. However, not all service outages and operational events are a result of the weather, even if occurring during a prevailing weather condition/event. Moreover, those operational parameter/events that are not caused by weather events may require a different approach to serving and repair. In this regard, power generation demand forecasting can be an important tool for power generation/transmission/distribution utilities in assessing and developing a cost effective and efficient mix of power generation, transmission/distribution and repair needed to meet electrical power load demands during potential outage causing events. Unfortunately, accurate weather-related power demand forecasting requires an ability to monitor and analyze existing power generation facilities and transmission/distribution grid operational events in light of constantly evolving weather patterns from days or even weeks past up to the present and including forecasts of several hours to weeks out. In this regard, utility companies need to be able to accurately identify where and what weather events are likely to disrupt electric service to customers so as to be able to proactively address power outage events or at least respond quickly with appropriate remedial measures. For example, if utility companies had access to effective methods and tools for studying, reviewing and correlating the evolution of various weather phenomenon/events to distribution grid operational events, information developed from such correlations could be used not only to address power outages as they occur but also to anticipate and prevent future equipment failures and power outages. Moreover, the access and use of such information would undoubtedly increase overall operating efficiency, reduce costs and improve customer satisfaction.

Consequently, there is presently a need and a desire in the electrical power generation, transmission and distribution industry for some effective means that would enable a power utility company to better anticipate and prepare for weather related operational events so as to reduce the number of power outages and improve customer satisfaction. In addition, it would be useful and beneficial to a power utility company to have some practical means to identify and visually display the time and locations of power outage events and/or other significant operational parameters/events that occur throughout the utility's electrical distribution infrastructure. It would also be useful to be able to readily distinguish and identify those operational parameters/events caused by weather events/phenomenon from those that are not and to be able to view a time-lapse evolution of weather and events. Accordingly, a computer-implemented tool/system is disclosed herein which, among other things, acquires information concerning operational parameters/events occurring in an electrical power transmission/distribution grid, determines a degree of correlation of each event to relevant weather phenomenon, and displays the acquired information in a user-controllable manner as an animated video-graphic time-lapse evolution.

BRIEF DESCRIPTION

The non-limiting example system, method and program product disclosed herein has the technical effect of providing a computer implemented tool for automatically acquiring information concerning operational parameters/events that occur throughout an electrical power transmission/distribution grid and correlating such parameters/events to geographically and temporally relevant weather phenomenon events, and for displaying the acquired and correlated information in a user-controllable, practical and useful manner. The contemplated implementation correlates the variation of operational parameters (e.g., power, outages, alarms, power demand, generation availability) to historical/forecast weather data at different points in times, and interactively presents the findings of the correlation on a graphical display that overlays weather radar/satellite/measurements/forecast maps, geographical network schematics, a graphical representation of events and their location, and a graphical representation of operational parameters and Key Performance Indicators (KPIs) (e.g., impact on revenue, customer satisfaction, etc.) at major nodal points on the electric network, including substations.

The illustrative non-limiting example system, method and program product described herein serves as an automated tool for obtaining and correlating significant operational events and/or operational parameter variations which may occur throughout the physical infrastructure/facilities of an electrical power utility's transmission/distribution grid (e.g., power output levels, power outages, alarms, power demands, power generation availability, etc.) on an ongoing basis with historical, current and/or forecast weather phenomenon/events. A user is then able to use an interface to the system/tool to control a visual output presentation on a video-graphic display, comprising an animation of the events, parameters and correlations on a geographical map. The system/tool employs an interactive timeline approach to user control over the presentation of output information which, for example, allows the user to vary the start time, stop time, interval and rate of a time-lapse evolution of displayed video-graphic information. The system/tool is also able to determine and display a representation of the relative severity of events and parameter evolution as a function of time which is selectable and variable under user control. In addition, the system/tool is also able to determine the likelihood of events and the evolution of operational parameters based on weather forecasts and present a video-graphic animated time-lapse evolution of such and/or present acquired weather and operational event information as a user-controllable interactive storyboard. For example, acquired information relating to specific weather phenomenon and facility operational parameter/event are displayed in a manner that visually overlays weather related information including measurement data, video, graphics, radar/satellite/forecast maps with a geographically accurate graphic layout/schematic representation of the physical infrastructure of a particular utility's power distribution grid. The graphical layout/schematic representing the utility's infrastructure may, for example, cover predetermined major distribution nodal points and substations, graphical representations of grid operational parameters/events at respective geographical occurrence locations, and other relevant/useful information such as graphical representations of relevant KPIs and/or other data indicative of operational event impact on revenue, customer satisfaction, etc. It is contemplated and intended by the inventor that the described example implementation be capable of displaying animated time-lapse representations depicting an evolution of events over time. It is also contemplated and intended by the inventor that the described implementation optionally include/integrate a learning capability for heuristically improving cause analysis and computed correlations.

The non-limiting example computer-implemented method, system and program product disclosed herein for providing graphical display of correlated weather information and power transmission/distribution grid operational events is contemplated by the inventor to employ the use of a corporate geographical information system (GIS), one or more sources/feeds of power grid operational event data and consumer feedback information for reporting changes in power availability, and one or more conventional sources/feeds of historical and forecast weather data (e.g., National Weather Service). Among other things, the non-limiting example computer-implemented method, system process and program product disclosed herein also serves as a useful and practical tool for enabling electrical power distribution grid controllers and operators to quickly and efficiently evaluate weather related events and determine what type, how much and how soon to implement anticipatory preparations to reduce or prevent weather induced outages.

As a non-limiting illustrative example implementation, the system/tool described herein determines and displays correlations between historical weather events and historical operational events and parameters of an electrical power utility's facilities including, among other things, outage events and rates, operating costs and lost revenues, customer satisfaction polling reports, and other potentially relevant operational parameters. The described exemplary system/tool is configured to display a commercial/corporate entity's infrastructure operational events, equipment/device parameters and their correlations or non-correlations to weather events on a geographical map presented in a user-controlled variable time-elapsed fashion that visually highlights and indicates the degree/significance for such events while providing a user controlled a graphic animation of time-elapsed parametric evolution of weather events/phenomenon. In the described example implementation, one or more operatively connected processors are used for determining a probable root cause of operational parameters/event, correlating operational events to weather phenomenon and displaying a time-lapse evolution weather phenomenon and operational parameters/events that occur at an electrical power distribution utility based upon acquired historical weather data/information, current observations and future condition forecasts, in a user controllable manner using, for example, a storyboard display of graphically animated weather events on a topographical or geographical map with related graphic overlays of a utility's physical infrastructure for indicating locations and severity of operational events/parameters occurring throughout the utility's operational facilities.

As illustrated by the non-limiting example of the computer-implemented geographic and temporal event correlation display method and system/tool described and disclosed herein, the inventor also contemplates that weather and distribution grid operational event data may be continually acquired and collected from appropriate reliable and relevant sources. For example, historical weather and forecast data may be acquired from various online or satellite feeds (e.g. National Weather Service); power distribution grid network models, layouts and related geographic location data may be acquired from energy distribution management systems, geographical information systems, or other corporate information systems; historical outage data may be acquired from power utility distribution management systems, outage management systems, equivalent utility management systems, related distribution grid device alarm sources such as power relays, device/equipment SCADA (supervisory control and data acquisition) interfaces, and IEDs (intelligent substation devices). It is also contemplated by the inventor that the described implementation takes advantage of established enterprise database, networking, and shared memory protocols, and retrieves the above data/information from established GIS, OMS (outage management system) and DMS (distributed management system) sources, and the like.

It is also further contemplated by the inventor that the system/tool presents geographic related operational event and weather information using a plurality of superimposed graphic/video image overlays or layers. In the non-limiting illustrative example disclosed herein, a base image is overlayed with at least three other information conveying graphic overlays or layers. In the disclosed example, a base image or background layer provides an areal view geographical surface map that displays surface terrain and regional major transportation infrastructure such as, e.g., roadways, railways, waterways, etc. A second graphic overlay or layer depicts regional weather events and may be animated under user control to show a time-lapse development or evolution of relevant weather phenomenon. This weather event layer may be developed using a combination of, for example, satellite photos/videos, radar echo imagery and other weather indicative graphics as might be use on conventional weather maps. A third graphic overlay or layer displays a set of icons/shapes representing a utility's particular infrastructure such as, for example, T&D lines, transformers, poles, plant locations, substations, and selected consumer locations. A fourth graphic overlay or layer is used to display specific predetermined icon/shapes representing parameters/events that are determined as probably being weather related and other parameters/events that are determined as probably not being related or caused by the weather. In one example, the kind and size of graphical icons/shapes used to depict operational parameters/events are selectable by the user and may depend, for example, on the particular type of operational parameter/event, value or impact that is represented. Of course, other arrangements and hierarchal orders using fewer or additional graphic overlays for displaying relevant information may also be set up by the user via the control input interface.

It is further contemplated by the inventor that the disclosed weather event-operational event system/tool includes a user control/command input interface enabling input of appropriate commands/controls for controlling the displaying of acquired information. In this regard, it is contemplated that the user interface enables displaying output information in a user-selectable hierarchical order in accordance with the user's interests. For example, a user may specify input commands to instruct the system/tool to evaluate only severe weather impacts—in which case severe storm impact locations, outages and abnormal parameters/conditions are displayed while data concerning other less relevant parameters/events are not. In another example, the particular graphic icons/indicia or symbols that are used to geographically indicate and display various weather-related operational parameters/events may be user-selectable and different in color or shape from icons/indicia/symbols used for displaying operational parameters/events which are unrelated to weather. The displayed operational parameter/event icons or indicia may also be displayed in various sizes, wherein the relative size is indicative of a relative severity or importance of the event in relation to other parameters/events.

Electrical power distribution grid operational events are filtered or sorted both geographically and temporally according to frequency of occurrence. Temporal and geographic "clusters" of events are identified and used in assessing a correlation to weather events. For example, it is ascertained whether particular geographic and/or temporal clusters of power distribution grid electrical events occurred before, during or after certain weather events so that direct weather effects and indirect weather consequences can be identified and distinguished. Event correlation is performed using known, established conventional correlation techniques. Once sufficient event data is acquired, time-stamped, location-stamped and clusters of events are identified, a single root cause is assigned to a cluster of events by assessing the most probable sequence of electrical events/conditions that created the power distribution grid operational event. For example, a root cause may be designated as being weather-related if a time stamp of a first event in a cluster is within the starting and ending times of a specific weather phenomenon and if the location stamp is within the geographic area affected by that particular weather phenomenon. The same criteria may be applied to specific electrical outage occurrences. A correlation/confidence factor between weather phenomenon and operational events, and/or other particular parameters of interest is also computed using conventional established methods. Such correlations and uncertainties (e.g., weak correlations) are displayed as such on the graphical output display as, for example, graphic icons or indicia which are displayed highlighted or scaled in size according to their respective relative importance or computed correlation/confidence factor. A heuristic/learning engine may also be employed for tracking previous correlation decisions and developing correlation indices should similar patterns of weather and parameter events later occur.

In addition, the non-limiting example system/tool, method, computer implementation and program product implementation described herein provides certain tangible and practical commercial benefits. For example, at least one tangible result is realized in the form of an automated information acquisition and analysis tool/system that provides a user-controllable interface for presenting a video-graphic time-lapse evolution of correlated weather events and operational events which affect a utility's electrical power transmission/distribution facilities. Moreover, through a collaboration and accumulation of data acquired from a plurality of different utilities which may be using the system/tool disclosed herein, e.g., multiple vendors who manage and operate electrical power generation or transmission/distribution networks, an improved integration of infrastructure related information from each vendor's operational system and improved leveraging of the data across these systems is realized and can be used to create new value that would not have been obtainable from such systems individually.

Although the particular illustrative non-limiting example computer implementation described herein is generally applicable toward providing an efficient tool for displaying time-lapse evolution of weather phenomenon and correlating electrical utility power transmission/distribution grid operational event information, it may likewise be used for geographic-to-weather or other phenomenon correlation and selectable animated event evolution display for other types of commercial entities or industrial complexes.

BRIEF DESCRIPTION OF THE DRAWINGS

The block diagrams in the figures below do not necessarily represent an actual physical arrangement of the example system, but are primarily intended to illustrate major procedural aspects and method steps in convenient functional groupings so that the non-limiting illustrative exemplary implementation presented herein may be more readily understood. The above described features and other aspects and advantages will be better and more completely understood by referring to the following detailed description of exemplary non-limiting illustrative implementations in conjunction with the drawings of which.

DETAILED DESCRIPTION

Figure 1:
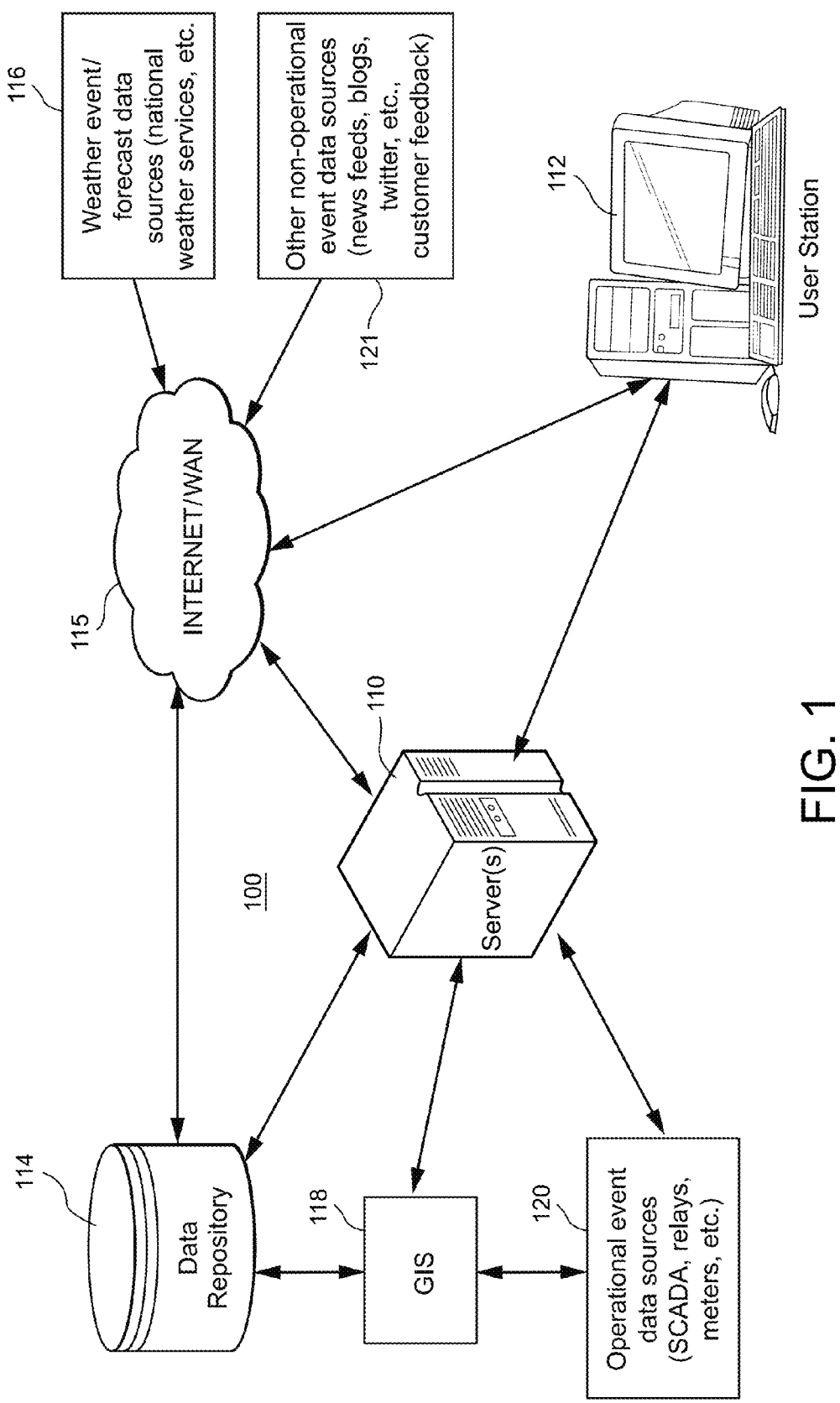
FIG. 1 is a non-limiting example operating environment and apparatus for performing the disclosed methods for correlation and display of operational parameters/events and weather phenomenon events.

FIG. 1 is a block diagram illustrating an exemplary operating environment for performing the disclosed method and apparatus for correlation and display of operational parameters/events and weather phenomenon events. This non-limiting example operating environment is only an example of an operating environment and is not intended to suggest any limitation as to the scope of use or functionality of operating environment architecture. Neither should the operating environment be interpreted as having any dependency or requirement relating to any one or combination of components depicted in the exemplary operating environment.

More specifically, FIG. 1 schematically illustrates an example computer network arrangement 100 with which the disclosed computer-implemented weather event-operational event correlation system/tool for providing a visual display of a corporate or commercial entity's infrastructure operational events/parameters and correlated weather events may be implemented. Operations performed by the correlation and display tool/system described herein, however, are not limited to solely being implemented using a single computer, network server or the particular hardware arrangement shown in FIG. 1. The weather event-operational event correlation and display system/tool and method described herein may be implemented using only a single computer and display or a plurality of networked computers and displays. In the particular illustrative example of FIG. 1, weather event-operational event correlation system/tool 100 may include one or more servers 110, one or more user interface workstation/display terminals 112, one or more data repositories 114 or other suitable data mass storage utility devices. In this example, a computer server 110 is used to perform the computer-implemented processes and analysis functions for implementing the basic weather event-operational event correlation system/tool described herein. One or more servers 110 may also be used and connected to the Internet 115 or other private/public WAN or LAN (not shown). System/tool 100 may include multiple and widely distributed access points for providing wired and/or wireless access, for example, via one or more user interface workstations/display terminals 112. Such workstations/display terminals 112 may be, by example and without limitation, one or more conventional PC workstations connected to the server(s) 110 according to conventional networking mechanisms including, without limitation, one or more wireless networking devices/stations, or handheld data terminals (sometimes conventionally known as Personal Data Assistants or PDAs) that may be connected to the server(s) 110 using conventional wireless data communication technology. Likewise, a portable laptop or tablet computer, or even simple keypads or touchscreen devices may also be used as user stations 112.

User interface workstation/display terminal devices 112 may include a conventional web-browser application (not shown) and/or other custom interface application for generally communicating and interacting with server 110 to access and operate the described operational event weather correlation and display tool/system. Although not explicitly depicted in FIG. 1, system 100 may include multiple workstation/terminal devices 112, multiple networked display devices and, of course, workstation/terminal devices 112 may also include conventional computer peripherals such as printers (for example, for printing out a particular screen display or other documents), data/command input devices such as a keyboard or wireless controller, as well as portable or handheld input/display devices. The user workstation/terminal devices 112 may also be used, for example, to enter particular display commands or user-selectable options or any other input data for use by the described event correlation display system. The correlation and display system/tool 100 accepts a variety of display control inputs through user interface 112 such as, for example, input commands/controls for enabling zoom, scroll, pan and time-lapse animation of the displayed graphical information. Data storage repository 114, which may be centrally located or distributed across Internet/network 115, represents one or more data storage units or devices for storing and maintaining historical weather data and correlation records and/or other relevant historical and statistical information/data regarding utility distribution grid operational parameters/events. The information maintained in data storage repository 114 preferably includes at least historical weather condition and event data for a geographical area/region relevant to a particular utility's distribution grid. For example, information stored in data repository 114 may include, among other things, records of past weather events occurring in the geographical area covering the distribution grid. Data repository 114 may also be used to store historical data of a utility's significant operational parameters/events including power outage events. This information may be made available via network 100 to server 110 and/or user stations/devices 112 as needed. In addition, other information such as specific application software or program data, for example, for implementing various statistical correlation assessment models may be stored and maintained in repository 114.

Also as part of network 100, and communicating or being accessible to the network server 110, are one or more sources of weather event/forecast data such as conventional local and national weather service feeds 116, a corporate GIS (geographic information system) 118, conventional data sources 120 from the utility's distribution grid for monitoring/reporting various operational events (e.g., SCADA, relays, meters, etc.) and other operational event data sources or feeds 121 (e.g., Internet news feeds, blogs, twitter, customer feedback sources, etc.).

Figure 2:
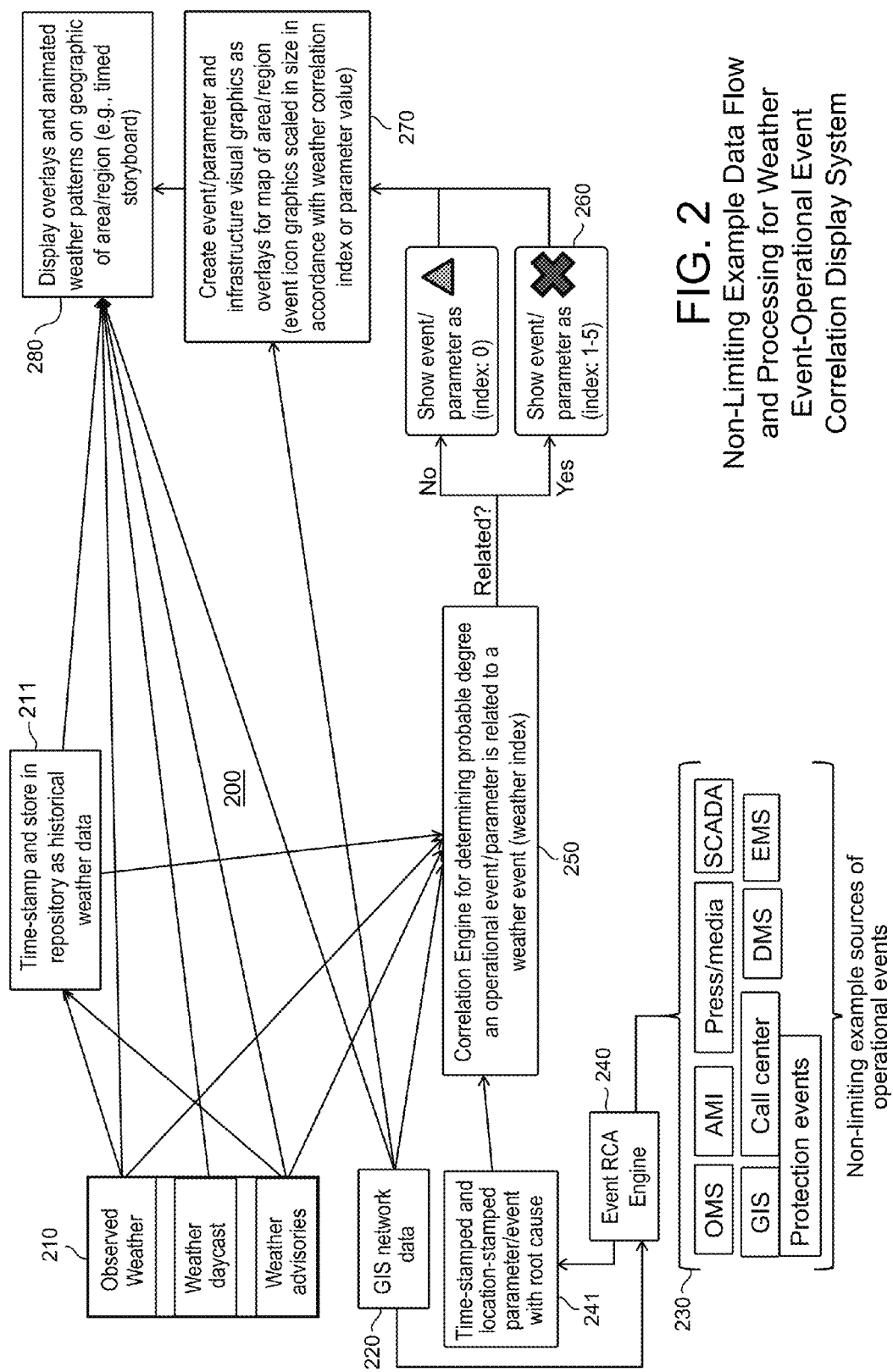
FIG. 2 is a high-level non-limiting example functional block diagram illustrating general data processing and information flow for the disclosed weather event-operational event correlation and display system.

FIG. 2 shows a general functional block diagram of basic data processing/information flow occurring in an example weather-event-to-operational-event correlation and display system which may be implemented using the example hardware arrangement of FIG. 1. Multiple known reliable sources 210 of weather event data/information covering a geographical area potentially relevant to a utility's facilities and operations are monitored. Such sources might include, for example, conventional national and local electronic feeds of observed weather data, daily weather forecasts and weather advisories. In this example, weather event data/information that may be geographically relevant to a particular utility's power generation or distribution facilities is acquired, time-stamped and stored in a mass data storage repository 211 used for maintaining historical records of accumulated weather data. A conventional GIS (geographic information system) 220 is utilized to provide geographic infrastructure data relating to the utility's power generation and distribution facilities. Preferably, GIS 220 is a corporate or enterprise GIS network developed by or for the particular power utility. Historical and real-time operational event information and data relating to ongoing and collected operational parameter data and events occurring throughout the utility's power distribution grid are acquired from multiple sources and a plurality of conventional data collection and monitoring equipment 230. Examples of such sources and equipment include, among other things, a utility's AMI (advanced major infrastructure) information, the utility's conventional OMS (outage management system), the utility's EMS (energy management system) data for wide area transmission lines, the utility's DMS (distribution management system) for local power distribution, the utility's GIS (geographic information system), SCADA (supervisory control and data acquisition) interfaces to switches/relays, as well as information acquired from customer call centers and local press/media sources.

A root cause analyzer (RCA) engine 240 is provided to sort, time-stamp and categorize the acquired operational parameter and event data according to time of occurrence and geographical location, and to determine and assign a possible root cause for the occurrence of each particular operational parameter or event. Time-stamped and geographically categorized (location-stamped) parameter or event data 241 is provided to a correlation engine 250 which also receives geographic data from GIS network 220 and time-stamped weather event information from monitored weather data sources 210 and historical weather data repository 211. Correlation engine 250 assesses and determines the degree to which a particular operational event/parameter is correlated in terms of geographical location and time-of-occurrence to a specific weather event. One skilled in the art can appreciate that a correlation engine for performing such tasks may be readily implemented using known conventional statistical analysis methods and computer programming techniques. Correlation assessments for each event may also be recorded and archived for aiding in future evaluations of subsequent operational parameters and events. Using this weather correlation assessment, operational parameters/events are identified as being weather related or non-weather related and may be further distinguished according to severity or operational significance. Distinctive graphic icon/indicia 260 of predetermined color, shape and size/scale may then be associated to different operational parameters/events for use in visually marking the significance and/or relevance of each when presented on a display. In one example implementation, graphic icons/indicia representative of various parameters/events are displayed on a corporate GIS map at a location corresponding to their occurrence and are scaled in size in accordance with the relative significance of the particular parameter/event that they are used to indicate. In other words, the position of an event/parameter occurrence is displayed as a graphic icon on a geographical map of the utility's facilities (e.g., a power distribution network) based on the corporate GIS data. Icons representing each parameter/event are displayed as an overlay on top of an animated time-lapse display of geographically related weather phenomenon graphics 280 along with GIS graphics of the utility's facility/equipment, and may also be displayed as different sizes or shapes in correspondence to their relative significance.

Figure 3:
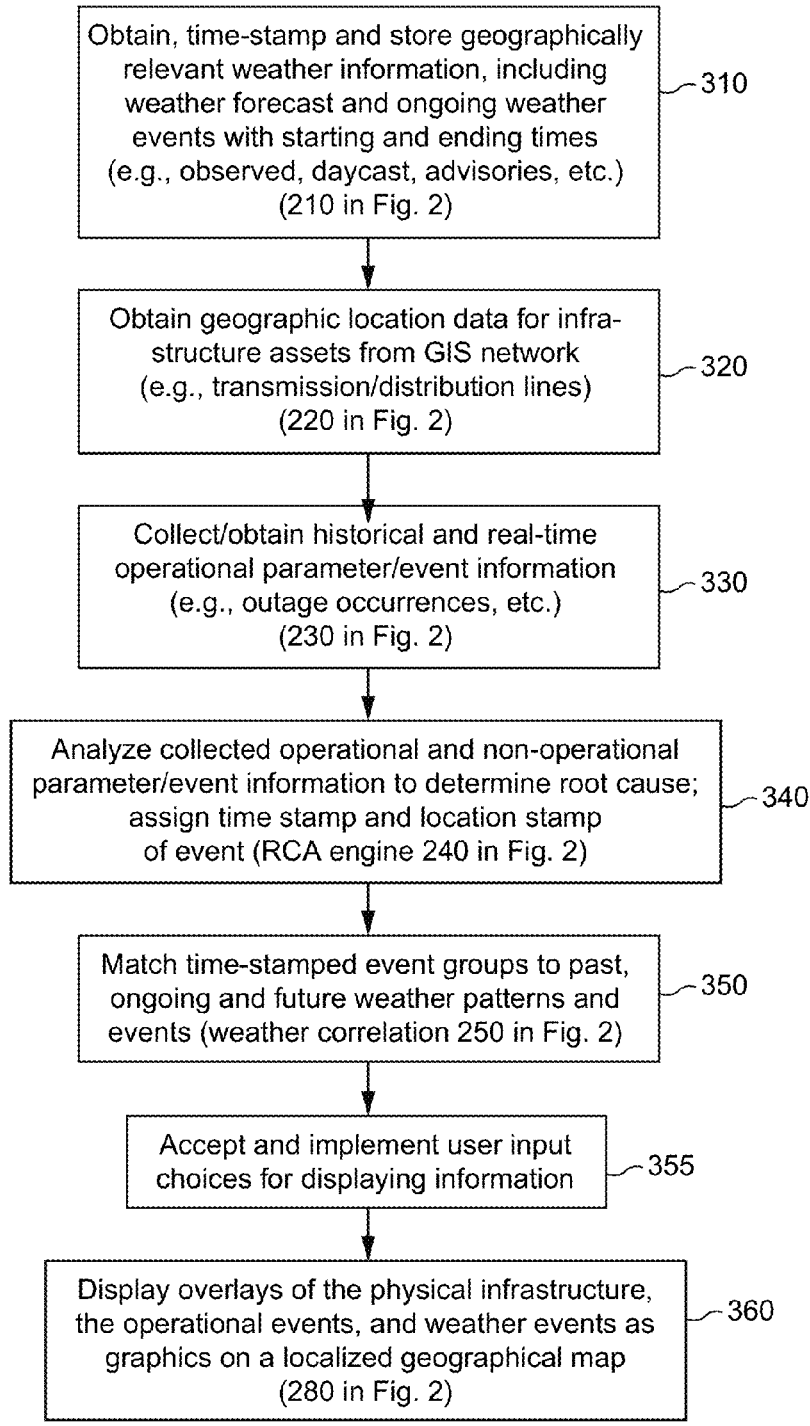
FIG. 3 is a flow diagram illustrating non-limiting example processing operations which may be performed by a computer server/processor for implementing the disclosed weather event-operational event correlation and display system.

Referring now to FIG. 3, a computer-implemented process flow diagram is provided to illustrate non-limiting example processing operations that are performed by a computer server/processor in implementing the weather event-operational event correlation display system disclosed herein. One skilled in the art would appreciate that the processing and display operations disclosed in the procedural blocks of FIG. 3 are not limited solely to being implemented by the particular hardware arrangement depicted in FIG. 1. Likewise, the computer implemented process for correlating weather events to utility grid operational events/parameters and displaying the correlations as overlaid graphics as disclosed and claimed herein is not necessarily limited to the specific algorithmic stepwise process of FIG. 3.

In the present example, as indicated in initial process block 310, geographically relevant weather information including forecasts is continuously acquired over time from multiple sources and recorded or stored on the system server 110. The acquired weather information may include, among other things, real-time radar and satellite video data, ground weather station data, personally observed and video surveillance camera data, weather advisory data compiled for ground and air traffic, conventional news and radio daycasts and the like. All recorded weather events are dated and time-stamped with event starting and ending times. It is contemplated that various local and national weather information sources be continuously monitored and the appropriate relevant weather data acquired as needed via conventional electronic communication means such as through the Internet, subscription cable/electronic news feeds or the like. As indicated in block 320, information relating to a particular entity's actual physical infrastructure and its geographic location is obtained from a corporate GIS database or the like maintained by that entity. This information may comprise, among other things, maps and graphics depicting the geographic location or placement of existing physical equipment and facilities such as, for example, the transmission and distribution lines of an electric power utility or the routes and stations of a mass transportation system or the like.

As indicated at block 330, information concerning significant operational events occurring or effecting the particular entity normal operations is also collected. In a manner similar to the acquisition and storage of weather data, operational event information may continually acquired or recorded in real-time, time-stamped and stored or appropriately archived for future retrieval and use. In the case of an electric power utility, such operational event information may include information and data relating to ongoing and previously collected parameter data and/or significant operational events, such as power outages or failed equipment, which might occur at different places in a utility's power distribution grid or within its geographic service areas. This operational event information may be acquired from multiple sources using a plurality of conventional data collection and monitoring equipment. As mentioned above, in the case of a power utility such sources might include, for example, AMI, OMS, EMS, DMS, GIS and SCADA interfaces, among others. Next, as indicated in block 340, currently ongoing or previously collected historical operational event/parameter information that occurred over a particular desired time span is analyzed and evaluated either to determine a most likely root cause for the occurrence of each operational event/parameter. A computer-implemented root cause analyzer (RCA) engine, described in greater detail below, uses current and historical operational event information including event/parameter time, location and type information to identify groups of events which may, for example, have a common physical/infrastructure related cause or a common geographical or temporal relationship. Identified groups of events determined as having a high probability of having a common cause are assigned a particular group root cause, time-stamp and location-stamp.

Next, as indicated in block 350, time-stamped common root-cause event groups are geographically and temporally matched to the acquired historic, ongoing and future forecast weather data. This information is then used, as indicated in block 360, for creating and displaying a localized geographic map containing graphic overlays of the entity's physical infrastructure, locations of the operational events/parameters and weather events in a manner which visually highlights highly correlated weather and operational events.

Figure 4:
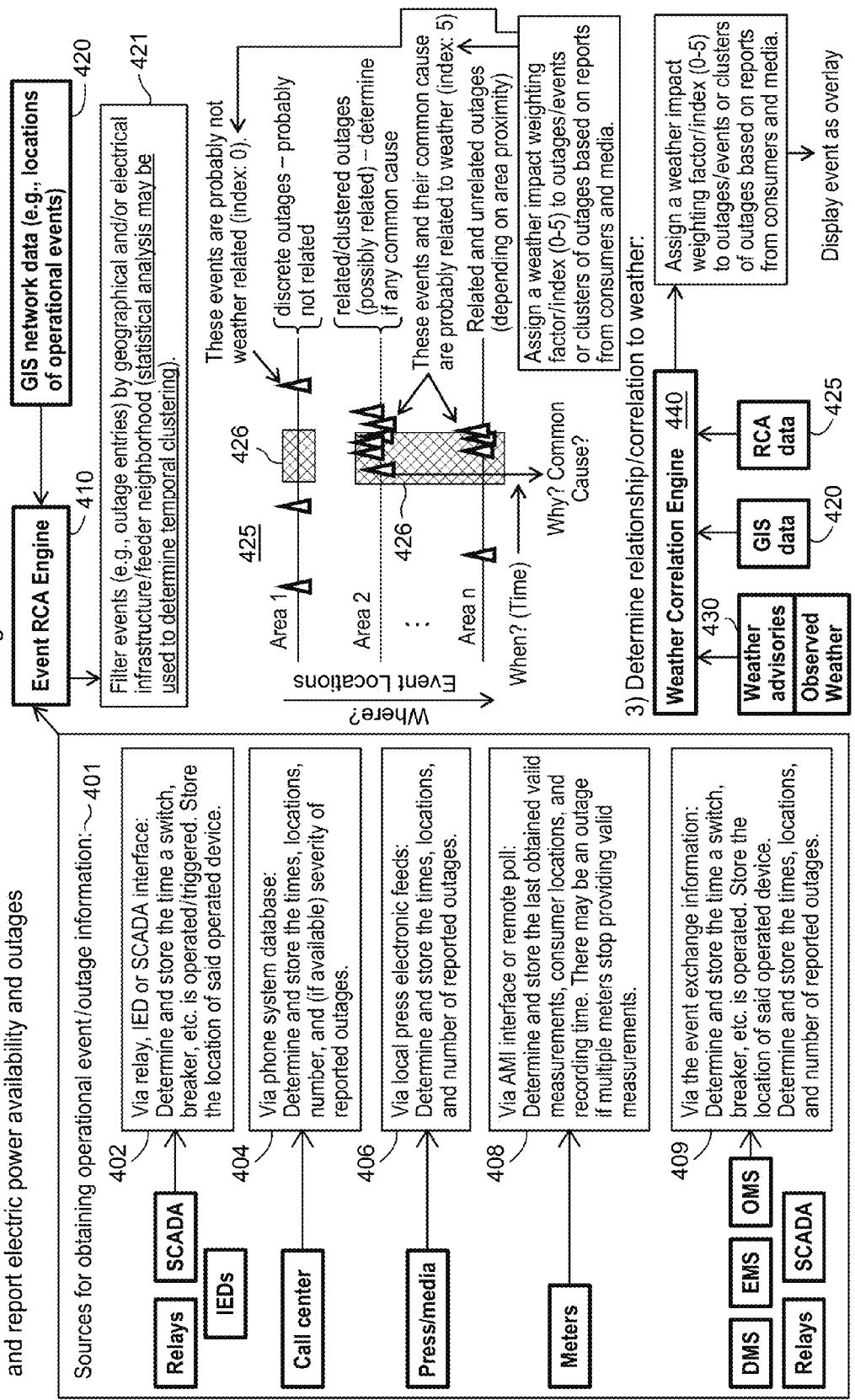
FIG. 4 is a diagram illustrating various details of basic processing operations performed by the weather event-operational event correlation and display tool.

As described above with respect to FIG. 1, it is contemplated that weather data and events are monitored on an ongoing basis and recorded or stored by the system server 110 in a data repository 114. Likewise, at the same time, operational parameter data and other event (e.g., power outage) information is also being acquired and accumulated by the system on an ongoing basis from multiple sources and devices 120. In FIG. 4 a functional block diagram illustrates a non-limiting example implementation of information and data processing performed by a contemplated weather-event-to-operational-event correlation display system for correlating historical and ongoing weather phenomenon/events to operational parameters/events occurring throughout the infrastructure of a large commercial electrical power distribution utility. In this example, the left-hand side of FIG. 4 illustrates typical processes and sources for collection of operational parameters/events and power outage information. This information may be received and collected through an arrangement of conventional wired and wireless communications equipment and systems, effectively forming a network of devices and systems conventionally used by electric power distribution utilities for monitoring and reporting electrical power availability and status throughout the power distribution grid. For example, current and ongoing status or operational condition of equipment/devices in the power distribution grid may be acquired using conventional communications from devices such as, for example, power switch relays and SCADA interfaces and the like (402). The specific times and locations at which a particular relay or breaker is triggered or other piece of monitored equipment is activated or operated are identified and recorded. Information regarding power availability and outages may also be acquired from commercial and residential customers (404) by employing a conventional customer/service call center phone system and an associated call information database for storing customer reported outages along with, for example, times of occurrence, location, number of occurrences and severity. Relevant times, locations and occurrences of power outages may also be acquired from the local press/media (406) via, for example, conventional electronic news feeds. Customer power meters (408) may also be used as a source for providing relevant outage event information via wireless remote meter polling or through the use of other AMI interfaces. For example, power meter devices outfitted as such may be configured to report the time of the last valid measurement at effected consumer locations or provide an alarm indication of a power outage in a particular area if multiple meters are detected as no longer providing valid data. Likewise, other conventional system resources such as DMS, EMS, OMS, relays and SCADA interfaces to equipment (409) may be used to obtain and exchange relevant operational event information.

With reference now to the right-hand side of FIG. 4, processes are described for sorting acquired operational parameter/event data and correlating that data to weather events. A computer-implemented root cause analyzer (RCA) engine 410 is employed for assigning a plausible common "root" cause to an event or group of events based on geographical areas and times of occurrence. The RCA engine first filters or identifies parameters/events (e.g., outages) according to geographical area or infrastructural portion (e.g., electrical service feeder neighborhood) and then looks to identify "clusters" of events having a predetermined degree of temporal proximity (i.e., groups of events that occur close together in time or within some predetermined timeframe or temporal range of one another). Geographic and/or corporate infrastructure information is obtained from an existing conventional corporate geographic information system (GIS) 420 and used for partitioning the power distribution system infrastructure into predetermined distinct geographic or service feed areas for event analysis. In the practice of electrical power transmission and distribution, empirical observations have shown that operational events, especially power outages, are often causally related if occurring close in time or physical proximity (either geographic or infrastructural). For example, operational events such as power outages which are identified as occurring within the same geographic area/neighborhood or electrical feed and which are temporally clustered about a particular time are likely to have a high probability of having a common root cause. This is especially true if the operational events also happen to coincide with the time and location of a particular weather phenomenon. In performing such root cause analysis of operational parameters/events, the computer implemented RCA engine may employ one or more conventional statistical analysis techniques and/or Bayesian networks or artificial intelligence (AI) algorithms to identify geographic and temporal clustering of events. Conventional computer-implemented heuristic learning algorithms may also be employed by the RCA engine to further improve the accuracy of its analysis over time.

An example functioning of the RCA engine for determining root-cause analysis of operational parameters/events occurring in a conventional electrical power distribution or transmission utility grid is graphically in the right-hand portion of FIG. 4 depicted at 425. As mentioned above, acquired operational parameter/event information is filtered according to geographical or electrical neighborhood. All entries of the same geographic/infrastructural neighborhood which fall into the same time cluster (temporal proximity) should theoretically have a high probability of being casually related. If a switch, relay or SCADA event data is available, and it appears to be the first event in a group of events identified within a same proximal time cluster of events, that event is taken/assigned as the common cause for events within that cluster. If not available, in the case of a power distribution network, the RCA engine uses the location that is closest or furthest to a substation as a common cause guess; or in the case of a power transmission network, the relay EMS and SCADA event should be used as the common cause. In depicted example, an arrangement of horizontal lines represent separate time-lines for distinct predetermined geographic areas (Areas 1-*n*) or, alternatively, distinct physical portions of a corporate/utility infrastructure, with each time-line spanning the same time period for each different area. Below the time-line for Area 2, additional similar time-lines are indicated as existing (although not shown) for other distinct areas. Significant operational parameters/events are represented as triangles arranged along horizontal time-lines. Cross-hatched blocks 426 along the time-lines represent acquired weather phenomenon/event information (e.g., weather advisories, observed weather conditions, etc.) which occurred during the time period of the time-line. For the same weather event, blocks 426 may not necessarily coincide or have the same start time or end time. In the illustration, the time-line for Area 1 shows a series of recorded operational events (e.g., power outages) which, although occurring within the same area, are significantly isolated or separated in time and are therefore discounted by the RCA engine as probably not being related in cause, or at least are considered as having a fairly low probability of a common root cause Immediately below the time-line for Area 1, is shown a time-line for an Area 2. Along the time-line for Area 2 it can be seen that numerous events are temporally clustered together. Since the events/outages are temporally closely clustered, there exists a greater probability that they share a common or related cause. The RCA engine will therefore either assign common cause (if known) to the group or determine a particular cause to assign to the group by some predetermined means or other information.

A computer-implemented weather-event-to-operational-event correlation engine 440 evaluates the temporal and geographical results of the RCA engine and correlates the weather events to clusters of operational events. Observed weather and weather advisories 430 information as well as historical weather data may be provided to correlation engine 440 directly from the weather feed sources (210) and from the data repository (211). A weather impact index/factor (e.g., an integer value ranging from 0 to 5) is assigned to each event cluster groups identified by the RCA engine as an indication of the degree of correlation between the weather event and the clustered group of operational events. As mentioned above, correlation engine for performing such tasks may be readily implemented using known conventional statistical analysis methods and computer programming techniques. In addition, conventional heuristic learning and artificial intelligence (AI)

algorithms (e.g., Bayesian network or other neural network algorithms) may also be employed by both the RCA engine and the correlation engine so that the described automated information acquisition, event correlation and information display system/tool (100) as a whole can become increasingly more accurate and responsive over time to a particular operational entity's infrastructure and local weather patterns.

Figure 5:
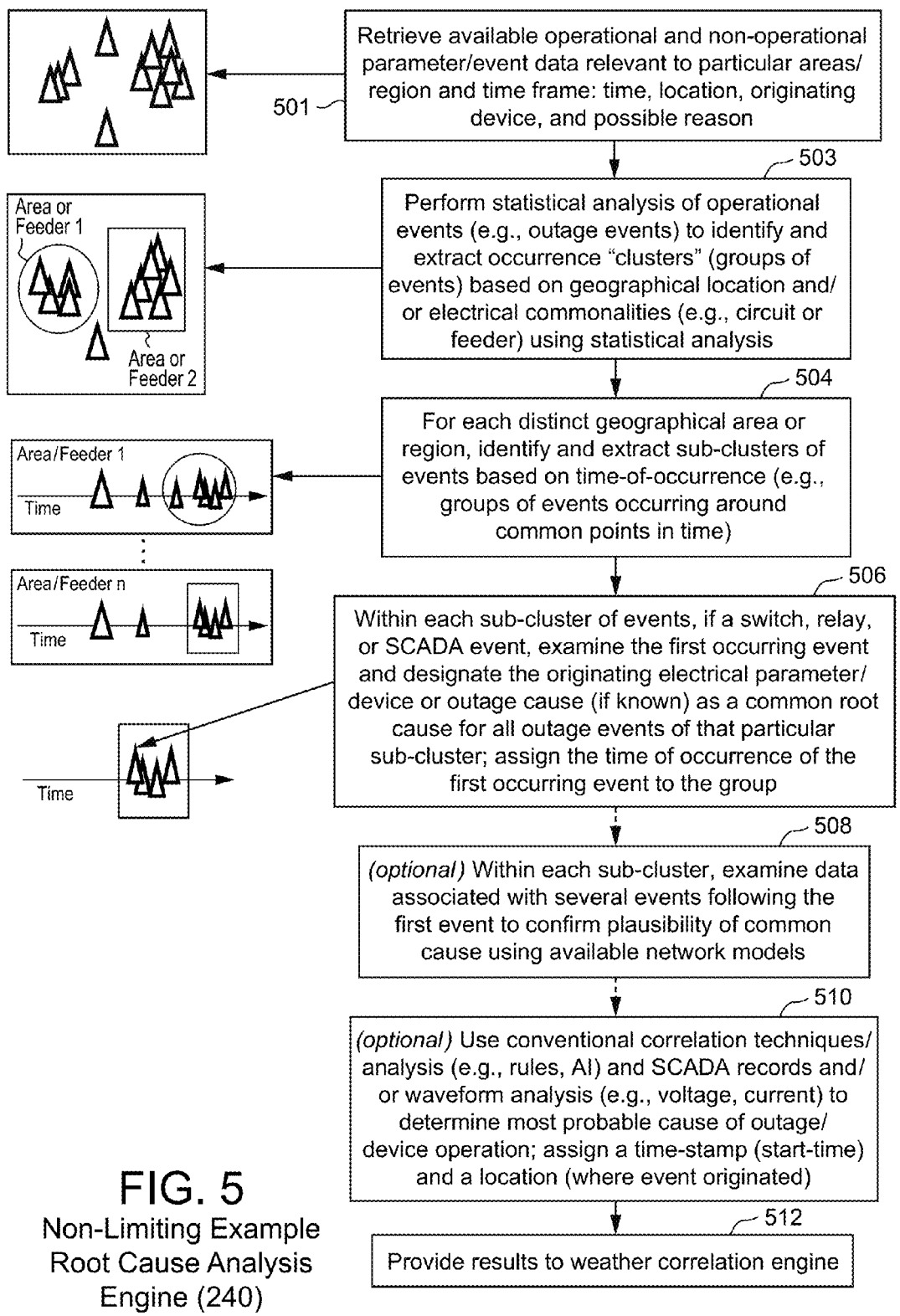
FIG. 5 is a processing flow diagram illustrating non-limiting example processing operations which may be executed by a computer server/processor for implementing the Root Cause Analysis Engine of FIG. 2.

In FIG. 5, a flowchart illustrates a series of non-limiting example processing operations executed, for example, by server 110 of FIG. 1, for implementing an event RCA (root cause analysis) engine (e.g., engine 240 of FIG. 2). Initially, as indicated in block 501, historical and current operational parameter/event data acquired over time which may be relevant to a particular selected region/area and occurring over a particular predetermined time period/frame are retrieved from data storage (e.g., repository 114) and provided to the RCA engine 240. As mentioned above, acquired operational parameter/event data will include information such as occurrence time, location, originating device and, if known or available, an associated possible cause or reason. As indicated by block 503, the RCA engine uses corporate GIS information and/or acquired occurrence location data to sort all operational events/parameters occurring over the predetermined time period according to distinct predetermined geographical areas or infrastructural portions (e.g., electrical feeder circuits). One or more conventional computer-implemented statistical analysis methods/routines are used to identify and extract occurrence clusters (groups of events) occurring within each predetermined geographic area or infrastructure portion. Next, as indicated in block 504, for each geographical area or infrastructural portion, one or more sub-clusters of events are identified based upon common timeframe-of-occurrence (i.e., multiple events grouped significantly close in time or occurring around common points in time). Next, as indicated in block 506, for each such identified sub-cluster group of events, the first occurring event within a sub-cluster is identified and the particular associated originating device or outage cause for that first event (if known) is then designated as a root common cause for all of the events within that particular sub-cluster. The time of occurrence of that first event is also assigned as a common time of occurrence for the sub-cluster group. Optionally, as indicated in block 508, the RCA may also examine the acquired data associated to each of several operational events following the first within each sub-cluster using, for example, AI or network modeling rules to validate or determine the plausibility of designating the same common cause to all of the sub-cluster events. In addition, as indicated in block 510, the RCA may also optionally employ one or more conventional computer-implemented statistical correlation techniques/methods and/or predetermined modeling language rules and analysis to analyze acquired SCADA records and waveforms (e.g., voltage, current, other parameters) to determine the most probable root cause for each particular device/event operation, tripping or outage, and then assign a specific time-stamp (e.g., a start time) and an originating location to each. Next, as indicated at block 512, the designated root cause and time-of-occurrence information for each event/parameter of predetermined significance and/or identified sub-cluster groups of events is provided to the computer-implemented weather correlation engine (250).

Figure 6:
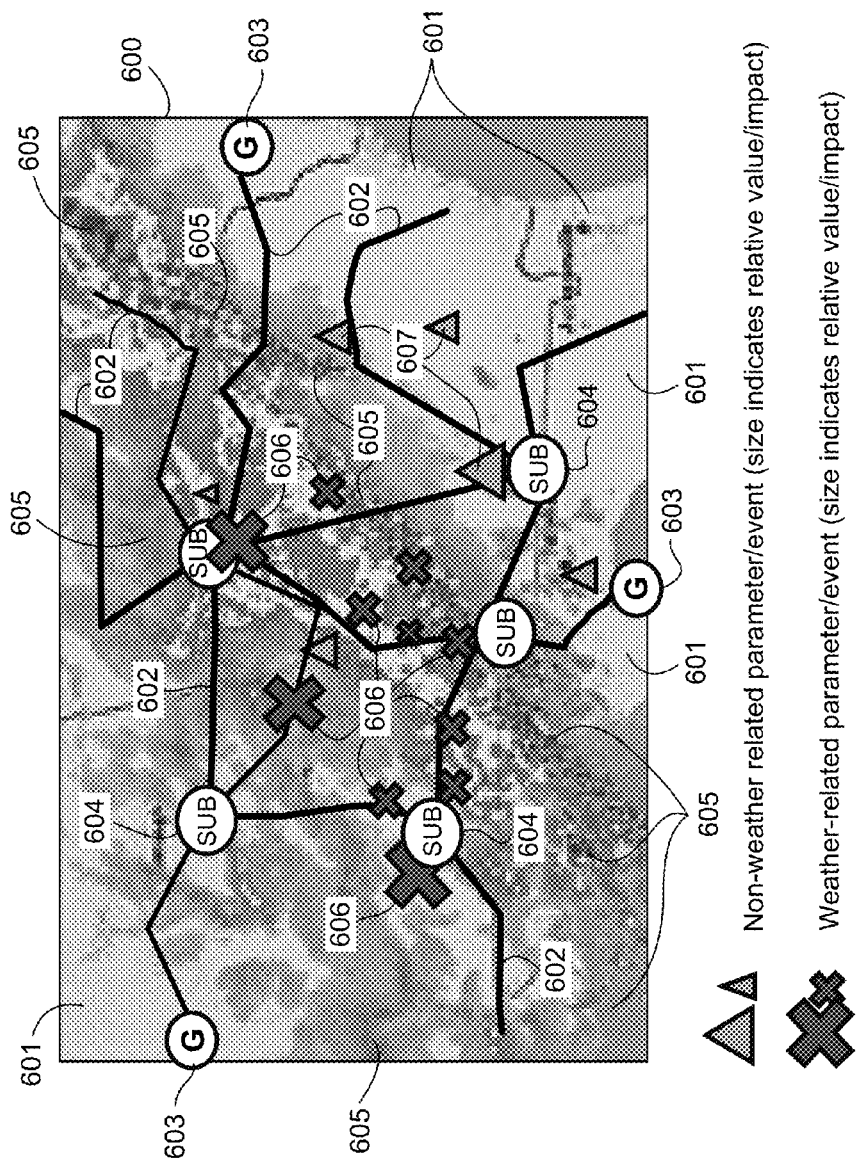
FIG. 6 is an image of a non-limiting example display screen output generated by the weather event-operational event correlation and display system/tool described herein.

FIG. 6 shows one non-limiting example output display format for a video screen/monitor 600 generated by the weather event-operational event correlation and display system/tool 100 described herein. The contemplated implementation enables user controllable animations of weather phenomenon to be displayed with graphic overlays representing a commercial/corporate entity's physical infrastructure, locations of operational parameters/events including an indication of whether an operational parameter/event is weather related or not, and some indication of the relative value or significance of each parameter/event. A typical output for displaying on a video screen/monitor would provide at least a geographic map of a particular user-selected area or region including animated video/graphic overlays of the regional weather and graphic overlays depicting relevant physical infrastructure of a particular corporate/commercial entity's facilities. As described above, the correlation and display system/tool 100 accepts a variety of display control inputs through a user station interface 112 and includes, among other things, input commands/controls for enabling zoom, scroll, pan and forward or reverse time-sequenced animation of the displayed graphical information. In the FIG. 6 example, operational events and correlations to weather are depicted for a conventional electrical power generation and distribution utility. A topological or geographic image of the local area is displayed as a base map layer 601 which can be displayed at a variety of user-selectable scales or zoom levels. The base layer map 601 is overlayed with user-controllable time-lapse video/graphic images of weather events/phenomenon 605. Overlayed on top of base map 601 and weather graphics/video 605 are graphics representing various aspects of the utility's physical infrastructure such as distribution lines 602, power generation stations 603 and substations 604. The locations of operational parameters/events are shown on the map as graphic icons and are indicated as either being weather-related or non-weather related by using different types, shapes or colors of graphic icons. In this example, weather related parameters/events are shown as solid "X" icons 606 and non-weather related parameters/events are shown as colored triangle icons 607. Different sizes of displayed icons 606 and 607 are used to indicate the respective parameter/event impact, value or significance. Other information such as indicia or a numerical index/weighting factor indicating the degree of correlation or probable cause of an operational event due to a weather event may also be visually displayed, for example, within or alongside an associated event icon or as a color-coded icon. One of ordinary skill can appreciate that many different display arrangements and types of overlays may be used for representing the acquired information and such are contemplated to be user customizable, assignable and configurable through the use of conventional input commands and instructions input a system user station/device 112 interface.

As described above, an implementation of the method disclosed herein may be in the form of computer-implemented process and/or program product for practicing those processes. An implementation may also be practiced or embodied in the form of computer program code containing instructions embodied in tangible media, such as floppy diskettes, CD ROMs, hard drives, or any other computer-readable storage medium, wherein when the computer program code is read and executed by a computer, the computer becomes an apparatus for practicing the disclosed process or method. An implementation may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is read and/or executed by a computer, the computer becomes an apparatus for practicing the disclosed process or method. When implemented on a general-purpose programmable microprocessor or computer, the computer program code configures the programmable microprocessor or computer to provide an apparatus that operates analogously to specific logic circuits (i.e., programmed logic circuitry).

While a disclosed process and apparatus is described herein with reference to one or more exemplary embodiments, it will be understood by those skilled in the art that various changes may be made and equivalence may be substituted for elements thereof without departing from the scope of the claims. In addition, many modifications may be made to the teachings herein to adapt to a particular situation without departing from the scope thereof. Therefore, it is intended that the claims not be limited to the specific embodiments disclosed, but rather include all embodiments falling within the scope of the intended claims. Moreover, the use of the terms first, second, etc. and indicia such as (i), (ii), etc. or (a), (b), (c) etc. within a claim does not denote any order of importance, but rather such terms are used solely to distinguish one claim element from another.

The above written description uses various examples to disclose exemplary implementations of the invention, including the best mode, and also to enable any person skilled in the art to practice the invention, including making and using any devices or systems and performing any incorporated methods. The patentable scope of the invention is defined by the claims which follow, and may include other examples that occur to those skilled in the art. While an exemplary implementation has been described herein in connection with what is presently considered to be the most practical and preferred embodiment, it is to be understood that the claimed invention is not to be limited to the disclosed example embodiments, but on the contrary, is intended to cover various modifications and equivalent arrangements included within the spirit and scope of the appended claims.

What is claimed is:

1. A system for correlating operational parameters and events of a physical infrastructure to a regional weather phenomenon, and displaying the acquired information, comprising:
   one or more electronic data feed sources for providing data and video-graphic information concerning regional weather phenomenon;
   a plurality of monitoring devices and operational status reporting sources for monitoring and reporting operational parameter and event information of a predetermined physical infrastructure;
   one or more data storage devices serving as a data repository for storing reported weather phenomenon information and reported operational parameter and event information;
   a geographic information system (GIS) for providing geographically referenced data relating to the predetermined physical infrastructure;
   one or more operatively connected computer processors configured to implement a root cause analysis engine (RCA) operatively associated with a weather data correlation engine for sorting and analyzing operational parameter and event information and geographically referenced data and identifying probable correlations to localized weather phenomenon, the identifying comprising:
      identifying a plurality of reported events that occurred in a particular geographic area based on the geographically referenced data;
      identifying one or more events comprised in the plurality of reported events that occurred within a predetermined temporal proximity of each other, thereby resulting in a clustered group of events;
      determining with high probability that it is likely that the clustered group of events have a common root cause;
      comparing reported parameter and event information of an event comprised in the clustered group of events that occurred first to reported weather phenomenon information;
      determining that a time-stamp and a location-stamp comprised in parameter and event information of the event that occurred first in the clustered group of events matches a time-stamp and a location-stamp comprised in weather phenomenon information of a weather phenomenon;
      computing a confidence factor of correlation between the clustered group of events and the weather phenomenon;
      assigning, to the clustered group of events, a common time-stamp, a common location-stamp, and a common root cause based on the computed confidence factor of correlation with the weather phenomenon, wherein the common time-stamp comprises the time-stamp of the weather phenomenon, wherein the common location-stamp comprises the location-stamp of the weather phenomenon, and wherein the common root cause comprises the weather phenomenon; and
      wherein said one or more operatively connected computer processors produce a video-graphic output comprising at least depictions of regional weather phenomenon overlayed with graphic indications of operational parameters and events or information relating to the predetermined physical infrastructure based on root cause analysis of the plurality of events and one or more identified probable correlations to weather phenomenon; and
   a user interface having a display and input controls for displaying and controlling video graphic data output from said processors, said user interface enabling user-controlled displaying of weather phenomenon and overlayed infrastructural and operational parameter and event information, wherein the user has at least control over a time-lapse or timeline evolution of displayed video-graphic information.

2. The system of claim 1 wherein regional weather phenomenon information includes weather advisories and weather forecasts.

3. The system of claim 1 wherein regional weather phenomenon information is time-stamped upon acquisition and stored in a computer network data repository.

4. The system of claim 1 wherein monitoring devices and operational status reporting sources include one or more of: an outage management system (OMS), an advanced major infrastructure (AMI), a supervisory control and data acquisition SCADA) interface, a GIS, a distributed management system (DMS), an energy management system EMS), conventional press and media data feed and a customer call center.

5. The system of claim 1 wherein the geographic information system (GIS) provides geographic information regarding an electrical utility power and distribution grid and equipment.

6. A computer implemented method for correlating operational parameters and events of a commercial entity or other physical operational infrastructure with weather phenomenon, the method implemented by a system comprising one or more electronic data feed sources for providing data and video-graphic information concerning regional weather phenomenon; a plurality of monitoring devices and operational status reporting sources for monitoring and reporting operational parameter and event information of a predetermined physical infrastructure; one or more data storage devices serving as a data repository for storing reported weather phenomenon information and reported operational parameter and event information; a geographic information system (GIS) for providing geographically referenced data relating to the predetermined physical infrastructure; the method comprising:

acquiring weather phenomenon information from the one or more electronic data feed sources and assigning a time-stamp identifying a time of occurrence to the weather phenomenon;

acquiring operational parameter and event data from the plurality of monitoring devices and operational status reporting sources for monitoring and reporting operational parameters and events of equipment or other operational infrastructure of said entity and assigning a time-stamp identifying a time of occurrence to each reported and event;

acquiring geographically referenced data relating to the predetermined physical infrastructure from the geographic information system (GIS);

identifying probable correlations to localized weather phenomenon using a root cause analysis engine (RCA) operatively associated with a weather data correlation engine for sorting and analyzing operational parameter and event information and geographically referenced data, the identifying comprising:

identifying a plurality of reported events that occurred in a particular geographic area based on the geographically referenced data;

identifying one or more events comprised in the plurality of reported events that occurred within a predetermined temporal proximity of each other, thereby resulting in a clustered group of events;

determining with high probability that it is likely that the clustered group of events have a common root cause;

comparing reported parameter and event information of an event comprised in the clustered group of events that occurred first to reported weather phenomenon information;

determining that a time-stamp and a location-stamp comprised in parameter and event information of the event that occurred first in the clustered group of events matches a time-stamp and a location-stamp comprised in weather phenomenon information of a weather phenomenon;

computing a confidence factor of correlation between the clustered group of events and the weather phenomenon;

assigning, to the clustered group of events, a common time-stamp, a common location-stamp, and a common root cause based on the computed confidence factor of correlation with the weather phenomenon, wherein the common time-stamp comprises the time-stamp of the weather phenomenon, wherein the common location-stamp comprises the location-stamp of the weather phenomenon, and wherein the common root cause comprises the weather phenomenon; and displaying operational parameters and events or groups of such parameters and events on a display screen in a manner such that an indication of a correlation between such parameters and events and weather phenomenon and event is visually presented and wherein a user has control via a user interface input over presentation of a time-lapse evolution displaying of weather phenomenon overlayed with graphics representing both weather-related and other relevant operational parameters and events depicted in relation to the entity's operational infrastructure.

7. The method of claim 6 wherein displayed operational parameters and events having a correlation to weather phenomenon are differentiated from parameters and events having no determined correlation to weather phenomenon by displaying event icons and indicia using different shapes or colors.

8. The method of claim 6 further including providing a store of historical weather event data for access by the weather correlation engine.

9. The method of claim 6 wherein monitoring devices and/or operational status reporting sources include one or more of the following conventional systems or devices: an outage management system (OMS), an advanced major infrastructure (AMI), a supervisory control and data acquisition (SCADA) interface, a geographic information system (GIS), a distributed management system (DMS), an energy management system (EMS), conventional press and media data feed and a customer call center.

10. A computer-readable non-transitory tangible storage medium embodying one or more sequences of computer-executable processing instructions which, when executed by one or more computer processors, perform operations for correlating and displaying operational parameters and events of a commercial entity or other physical operational infrastructure with weather phenomenon, implemented by a system comprising one or more electronic data feed sources for providing data and video-graphic information concerning regional weather phenomenon; a plurality of monitoring devices and operational status reporting sources for monitoring and reporting operational parameter and event information of a predetermined physical infrastructure; one or more data storage devices serving as a data repository for storing reported weather phenomenon information and reported operational parameter and event information; a geographic information system (GIS) for providing geographically referenced data relating to the predetermined physical infrastructure; the processing instructions comprising:

a first sequence of instruction that acquires weather phenomenon information from the one or more electronic data feed sources and assigns a time-stamp identifying a time of occurrence to the weather phenomenon;

a second sequence of instruction that acquires operational parameter and event data from the plurality of monitoring devices and operational status reporting sources for monitoring and reporting operational parameters and events of equipment or other operational infrastructure of said entity and assigns a time-stamp identifying a time of occurrence to each reported parameter and event;

a third sequence of instruction that acquires geographically referenced data relating to the predetermined physical infrastructure from the geographic information system (GIS);

a fourth sequence of instruction that identifies probable correlations to localized weather phenomenon using a root cause analysis engine (RCA) operatively associated with a weather data correlation engine for sorting and analyzing operational parameter and event information and geographically referenced data, the identifying comprising:

identifying a plurality of reported events that occurred in a particular geographic area based on the geographically referenced data;

identifying one or more events comprised in the plurality of reported events that occurred within a predetermined temporal proximity of each other, thereby resulting in a clustered group of events;

determining with high probability that it is likely that the clustered group of events have a common root cause;

comparing reported parameter and event information of an event comprised in the clustered group of events that occurred first to reported weather phenomenon information;

determining that a time-stamp and a location-stamp comprised in parameter and event information of the event that occurred first in the clustered group of events matches a time-stamp and a location-stamp comprised in weather phenomenon information of a weather phenomenon;

computing a confidence factor of correlation between the clustered group of events and the weather phenomenon;

assigning, to the clustered group of events, a common time-stamp, a common location-stamp, and a common root cause based on the computed confidence factor of correlation with the weather phenomenon, wherein the common time-stamp comprises the time-stamp of the weather phenomenon, wherein the common location-stamp comprises the location-stamp of the weather phenomenon, and wherein the common root cause comprises the weather phenomenon; and a fifth sequence of instruction that cause a user interface having input controls and a display device to display said operational parameters and events or groups of such parameters and events on a display screen in a manner such that an indication of a correlation between such parameters and events and weather phenomenon and event is visually presented and wherein a user has control via a user interface input over presentation of a time-lapse evolution displaying of weather phenomenon overlayed with graphics representing both weather-related and other relevant operational parameters and events depicted in relation to the entity's operational infrastructure.

* * * * *